(12) United States Patent
Yang (10) Patent No.: US 12,149,976 B2
(45) Date of Patent: Nov. 19, 2024

(54) MEASUREMENT CONTROL METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 415 days.

(21) Appl. No.: 17/643,121

(22) Filed: Dec. 7, 2021

(65) Prior Publication Data

US 2022/0104060 A1 Mar. 31, 2022

Related U.S. Application Data

(63) Continuation of application No. PCT/CN2019/100925, filed on Aug. 16, 2019.

(51) Int. Cl.
*H04W 24/10* (2009.01)
*H04W 76/30* (2018.01)

(52) U.S. Cl.
CPC ........... *H04W 24/10* (2013.01); *H04W 76/30* (2018.02)

(58) Field of Classification Search
CPC ...... H04W 76/30; H04W 24/10; H04W 48/20
See application file for complete search history.

(56) References Cited

U.S. PATENT DOCUMENTS

| 2019/0014492 | A1  | 1/2019 | Kim et al. |  |
|---|---|---|---|---|
| 2022/0116809 | A1* | 4/2022 | Cheng | H04W 76/30 |
| 2022/0248277 | A1* | 8/2022 | Cheng | H04W 36/08 |
| 2023/0135437 | A1* | 5/2023 | Jung | H04W 76/30 |
|  |  |  |  | 370/329 |
| 2024/0032135 | A1* | 1/2024 | Cheng | H04W 24/10 |
| 2024/0098547 | A1* | 3/2024 | Kim | H04W 24/10 |

FOREIGN PATENT DOCUMENTS

| CN | 102271361 A | 12/2011 |
| CN | 103813379 A | 5/2014 |
| CN | 105376769 A | 3/2016 |

(Continued)

OTHER PUBLICATIONS

International Search Report issued Apr. 26, 2020 of PCT/CN2019/100925 (4 pages).

(Continued)

*Primary Examiner* — Brian D Nguyen
(74) *Attorney, Agent, or Firm* — Perkins Coie LLP (57) ABSTRACT

The present application discloses a measurement control method, comprising: a terminal device, after receiving a first measurement configuration sent by a first network device, receiving a first message sent by a second network device, wherein the first message is used by the terminal device to acquire a second measurement configuration and/or to determine processing for the first measurement configuration, and the first measurement configuration and the second measurement configuration are cell measurement configurations (Continued)

A terminal device receives a first message sent by a second network device after receiving a first measurement configuration sent by a first network device — S201

The terminal device sends a second message to the second network device, the second message being used for indicating that the terminal device has a reportable measurement result corresponding to the first measurement configuration — S202

The terminal device obtains a second measurement configuration and/or the terminal device determines a processing for the first measurement configuration according to the first message — S203 in an effective region. The application further discloses another measurement control method, an electronic device, and a storage medium.

14 Claims, 6 Drawing Sheets

(56) References Cited

FOREIGN PATENT DOCUMENTS

| | | |
|---|---|---|
| CN | 105430686 A | 3/2016 |
| CN | 107637129 A | 1/2018 |
| CN | 108632810 A | 10/2018 |
| CN | 108811008 A | 11/2018 |
| CN | 109309969 A | 2/2019 |
| CN | 109644355 A | 4/2019 |
| CN | 109952780 A | 6/2019 |
| CN | 110035447 A | 7/2019 |
| WO | 2018082586 A1 | 5/2018 |
| WO | 2018166331 A1 | 9/2018 |
| WO | 2018201731 A1 | 11/2018 |
| WO | 2020180226 A1 | 9/2020 |

OTHER PUBLICATIONS

First Office Action of the Chinese application No. 201980097240.9, issued on Aug. 4, 2023. 17 pages with English translation.
Second Office Action of the Chinese application No. 201980097240.9, issued on Sep. 23, 2023. 13 pages with English translation.
CATT,R2-1905877 "Available Cell (Re)selection Measurement Result Reporting". 3GPP TSG-RAN WG2 Meeting #106 Reno, Nevada, USA, May 13-17, 2019. 4 pages.
Third Office Action for Chinese Application No. Issued Nov. 20, 2023 , 7 Pages with English Translation.
3GPP "NR; NR and NG-RAN Overall Description; Stage 2 (Release 15)" 3GPP TS 38.300 V15.6.0 (Jun. 2019). 99 pages.
Ericsson "Handling of idle/inactive measurement configuration during 2-step Resume/Release" R2-1906014; 3GPP TSG RAN WG2 #106; Reno, Nevada, USA; May 13-17, 2019. 6 pages.
Ericsson (Rapporteur) "Summary of email discussion [106#37][NR/DCCA]: UE behaviour regarding idle measurement configurations and measurement results" R2-1910290; 3GPP TSG RAN WG2#107; Prague, Czech Republic, Aug. 26-30, 2019. 30 pages.
Extended European Search Report for European Application No. 19942520.8 issued Mar. 4, 2022. 20 pages.
Qualcomm Incorporated "UE behaviours in NR early measurements" R2-1905543; 3GPP TSF RAN WG2 Meeting #106; Reno, NV, USA; May 13-17, 2019. 7 pages.

* cited by examiner

MEASUREMENT CONTROL METHOD, ELECTRONIC DEVICE, AND STORAGE MEDIUM

CROSS-REFERENCE TO RELATED APPLICATION

The present application is a continuation application of International Application No. PCT/CN2019/100925, filed on Aug. 16, 2019, the entire content of which is hereby incorporated by reference.

TECHNICAL FIELD

The present application relates to the field of wireless communication technologies, in particular to a measurement control method, an electronic device, and a storage medium.

BACKGROUND

In related technologies, a terminal device has different measurement requirements for different cells, and how the terminal device manages a measurement configuration and reports a measurement result according to different measurement requirements is a technical problem, there is currently no effective solution for this problem.

SUMMARY

To solve the above technical problem, an embodiment of the present application provides a measurement control method, an electronic device, and a storage medium, and a network device can control the terminal device to manage a measurement configuration and report a measurement result.

In a first aspect, an embodiment of the present application provides a measurement control method, which includes: receiving, by a terminal device, a first message sent by a second network device after receiving a first measurement configuration sent by a first network device; wherein the first message is used for the terminal device to obtain a second measurement configuration, and/or for the terminal device to determine a processing for the first measurement configuration, wherein the first measurement configuration and the second measurement configuration are cell measurement configurations in a validity area.

In a second aspect, an embodiment of the present application provides a measurement control method, which includes: sending, by a network device, a first message to a terminal device; wherein the first message is used for the terminal device to obtain a second measurement configuration, and/or for the terminal device to determine a processing for a first measurement configuration, wherein the first measurement configuration and the second measurement configuration are cell measurement configurations in a validity area.

In a third aspect, an embodiment of the present application provides a terminal device, which includes a first receiving unit configured to receive a first message sent by a second network device after receiving a first measurement configuration sent by a first network device; wherein the first message is used for the terminal device to obtain a second measurement configuration, and/or for the terminal device to determine a processing for the first measurement configuration, wherein the first measurement configuration and the second measurement configuration are cell measurement configurations in a validity area.

In a fourth aspect, an embodiment of the present application provides a network device, which includes a second sending unit configured to send a first message to a terminal device; wherein the first message is used for the terminal device to obtain a second measurement configuration, and/or for the terminal device to determine a processing for a first measurement configuration, wherein the first measurement configuration and the second measurement configuration are cell measurement configurations in a validity area.

In a fifth aspect, an embodiment of the present application provides a terminal device, including: a processor and a memory configured to store a computer program that is runnable on the processor, wherein the processor is configured to perform acts of the above measurement control method performed by the above terminal device when the computer program is run on the processor.

In a sixth aspect, an embodiment of the present application provides a network device, including: a processor and a memory configured to store a computer program that is runnable on the processor, wherein the processor is configured to perform acts of the above measurement control method performed by the above network device when the computer program is run on the processor.

In a seventh aspect, an embodiment of the present application provides a storage medium, storing an executable program, wherein, when the executable program is executed by a processor, the above measurement control method performed by the above terminal device is implemented.

In an eighth aspect, an embodiment of the present application provides a storage medium, storing an executable program, wherein, when the executable program is executed by a processor, the above measurement control method performed by the above network device is implemented.

The measurement control method provided by the embodiment of the present application includes: receiving, by a terminal device, a first message sent by a second network device after receiving a first measurement configuration sent by a first network device; and obtaining, by terminal device, a second measurement configuration according to the first message, and/or determining, by the terminal device, a processing for the first measurement configuration. Therefore a network device can send a corresponding measurement configuration to a terminal device aiming at different measurement requirements of different cells in a same state of the terminal device and different measurement requirements of different cells in different states of the terminal device, thus the terminal device can delete unnecessary measurement configuration and measurement result of a target cell in time; thereby saving power of the terminal device and reducing a storage load of the terminal device. By receiving a latest measurement configuration in time, the terminal device can meet a latest measurement requirement of the network device, thereby realizing measurement control of the terminal device by the network device.

DETAILED DESCRIPTION

In order to understand features and technical contents of the embodiments of the present application in more detail, implementations of the embodiments of the present application will be described in detail below in combination with the accompanying drawings, which are for reference only and are not intended to limit the embodiments of the present application.

Before the measurement control method provided by an embodiment of the present application is described in detail, a New Radio (NR) system will be briefly described.

At present, with people's pursuit of speed, delay, high-speed mobility, and energy efficiency, and diversity and complexity of services in future life, the 3rd Generation Partnership Project (3GPP) International Organization for Standard has begun to research and develop the 5th-generation (5G) communication. Main application scenarios of the 5G are: Enhance Mobile Broadband (eMBB), Ultra Reliable Low Latency Communications (URLLC), and Massive Machine Type Communication (mMTC).

The eMBB still aims at enabling users to obtain multimedia contents, services, and data, and demands thereof are growing very rapidly. On the other hand, since the eMBB may be deployed in different scenarios, such as indoor, an urban district, and a rural area, and differences in their capabilities and demands are also relatively large, they cannot be generalized, and must be analyzed in detail in combination with specific deployment scenarios. Typical applications of the URLLC include: industrial automation, power automation, telemedicine operation (surgery), traffic safety guarantee, or the like. Typical characteristics of the mMTC include: a high connection density, a small data volume, a latency-insensitive service, a low cost and a long service life of modules, or the like.

The NR system may also be deployed independently. In order to achieve purposes of reducing air interface signaling, quickly resuming wireless connection and data service in 5G networks, apart from a Radio Resource Control (RRC) IDLE state and an RRC_CONNECTED state, a new RRC state, that is, an RRC_INACTIVE state, is defined.

In the RRC_IDLE state, mobility is cell selection and re-selection based on a User Equipment (UE), paging is initiated by a Core Network (CN), and a paging area is configured by the CN. There is no UE Access Stratum (AS) context or RRC connection between a network device and a UE.

In the RRC_CONNECTED state, there is RRC connection and a UE AS context between a UE and a network device. A location of the UE known by the network device is at a specific cell level. Mobility is controlled by the network device. Unicast data may be transmitted between the UE and the network device.

In the RRC_INACTIVE state, mobility is a UE-based cell re-selection, there is a connection between a CN and an NR, there is a UE AS context on a certain network device, paging is triggered by a Radio Access Network (RAN), a RAN-based paging area is managed by the RAN, and a location of the UE known by the network device is at a RAN-based paging area level.

Figure 1:
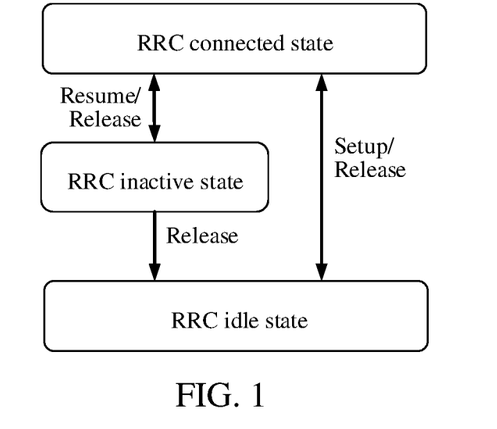
FIG. 1 is a schematic diagram of state transition of a terminal device in the present application.

A network device may control state transition of a terminal device. A schematic diagram of state transition of the terminal device is as shown in FIG. 1, a state of the terminal device may be transitioned between an RRC_CONNECTED state and an RRC_IDLE state. The state of the terminal device may also be transitioned between the RRC_CONNECTED state and an RRC_INACTIVE state. The state of the terminal device may also be transitioned from the RRC_INACTIVE state to the RRC_IDLE state.

When the terminal device is in the RRC_INACTIVE state, the terminal device may autonomously return to the RRC_IDLE state under any of the following situations: 1) the terminal device receives an initial paging message of a CN; 2) the terminal device initiates an RRC resume request, starts a timer T319, and the timer T319 times out; 3) integrity protection verification of Message (MSG) 4 fails; 4) cell re-selection to another Radio Access Technology (RAT); and 5) the terminal device enters a camp on any cell state.

Figure 2:
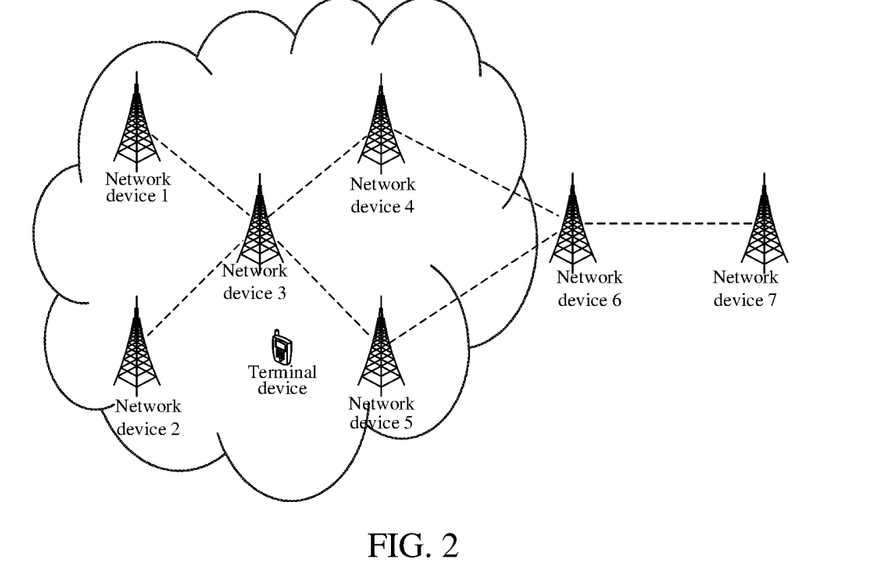
FIG. 2 is a schematic diagram of a Radio Access Network (RAN)-based Notification Area (RNA) when a terminal device is in an inactive state in the present application.

While the terminal device is in the RRC_INACTIVE state, a connection between the RAN and the CN is maintained; the terminal device and at least one network device store an AS context; the terminal device is reachable to the RAN, and relevant parameters of the terminal device are configured by the RAN; there is no need to inform a network device when the terminal device moves within a RAN-based Notification Area (RNA) configured by the RAN, but the network device needs to be informed when the terminal device moves outside the RNA; and cell selection and re-selection procedure is followed when the terminal device moves within the RNA. A schematic diagram of an RNA when a terminal device is in an RRC_INACTIVE state is as shown in FIG. 2, cells corresponding to network device 1, network device 2, network device 3, network device 4, and network device 5 belong to the RNA.

When the terminal device moves within the RNA, there is no need to inform a network device, and a mobility behavior in the RRC_IDLE state, that is, a principle of cell selection and re-selection, is followed. When the terminal device moves out of a paging area configured by the RAN, the terminal device may be triggered to resume an RRC connection and re-obtain the paging area configured by the RAN. When downlink data arrives at the terminal device, a network device that maintains a connection between the RAN and the CN for the terminal device will trigger all cells in a RAN paging area to send paging messages to the terminal device, so that the terminal device in the RRC_INACTIVE state may resume an RRC connection and receive data. The terminal device in the RRC_INACTIVE state is configured with the RAN paging area in which in order to ensure reachability of the terminal device, the terminal device needs to update its location periodically according to a period configured by a network device. A scenario that triggers the terminal device to perform RNA Update (RNAU) includes that a RNAU timer based on the RAN times out or a UE moves to an area outside the RNA.

When a target base station for which the terminal device initiates the RRC connection resume process is not an anchor network device, the anchor network device determines whether a UE context needs to be transferred to a target network device. Therefore, the target network device will usually send a cause carried in an RRC connection resume request message initiated by the terminal device to the anchor network device in a UE context request process, and the anchor network device will determine whether a UE context needs to be transferred to the target network device. For example, periodic RAN location update generally does not require context transfer.

Figure 3:
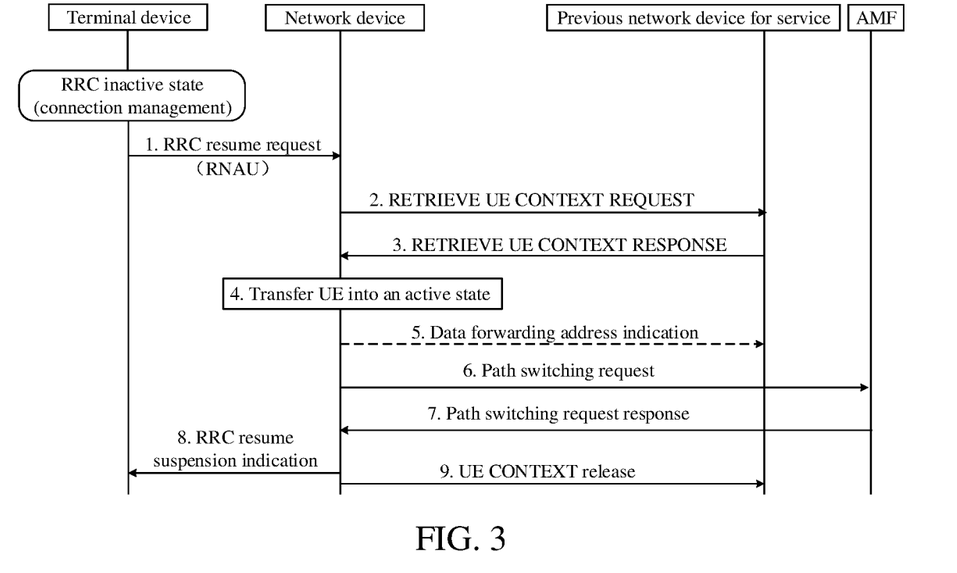
FIG. 3 is a schematic diagram of a processing flow of RNA Update (RNAU) with User Equipment (UE) context transfer in the present application.
Figure 4:
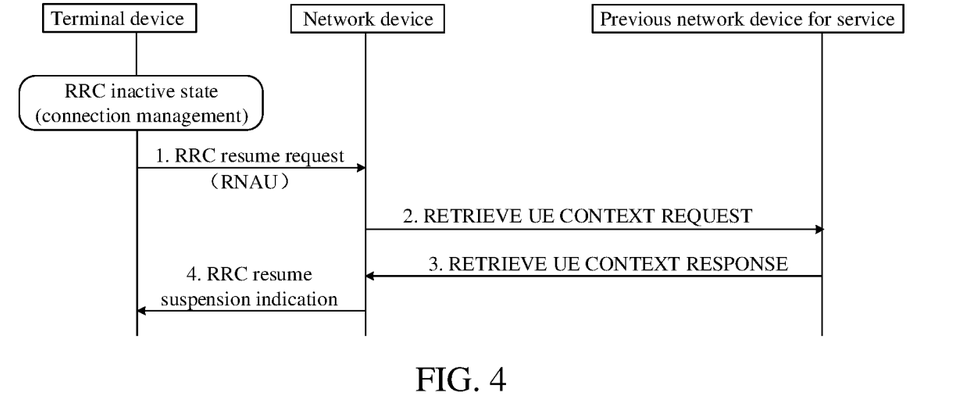
FIG. 4 is a schematic diagram of a processing flow of RNAU without UE context transfer in the present application.

A processing flow of RNAU with UE context transfer is shown in FIG. 3. A processing flow of RNAU without UE context transfer is shown in FIG. 4. Compared with the processing flow of RNAU without UE context transfer, operations of a network device sending a PATH SWITCH REQUEST to an Access and Mobility Management Function (AMF) entity, receiving a PATH SWITCH REQUEST RESPONSE sent by AMF, and releasing the UE context are added in the processing flow of RNAU with UE context transfer.

Figure 5A:
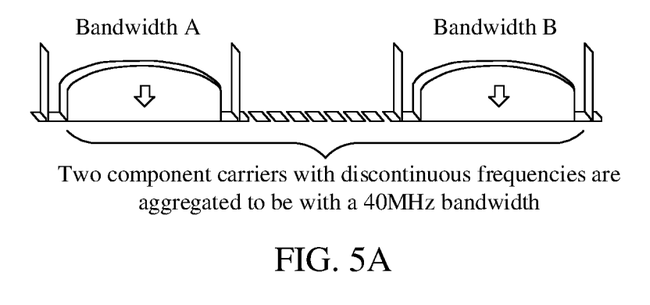
FIG. 5A is a schematic diagram of carrier aggregation in the present application.
Figure 5B:
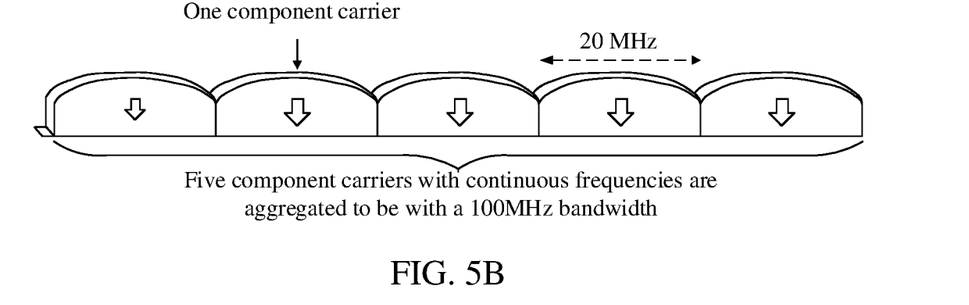
FIG. 5B is a schematic diagram of another carrier aggregation in the present application.

In order to meet a requirement of high speed, a 5G network also supports a Carrier Aggregation (CA) technology. A schematic diagram of carrier aggregation is as shown in FIG. 5A; a schematic diagram of another carrier aggregation is as shown in FIG. 5B. The Carrier Aggregation enables an NR system to support a larger bandwidth by jointly scheduling and using resources on multiple Component Carriers (CCs), thus achieving a higher system peak rate. According to continuity of aggregated carriers in spectrum, the Carrier Aggregation may be divided into continuous carrier aggregation and discontinuous carrier aggregation. According to whether bands where aggregated carriers are located are the same, the Carrier Aggregation may be divided into Intra-band carrier aggregation and inter-band carrier aggregation.

There is only one Primary Component Carrier (PCC) in the aggregated carriers, and the PCC provides an RRC signaling connection, a Non-Access Stratum (NAS) function, security and so on. A Physical Uplink Control Channel (PUCCH) exists only on the PCC. There is also a Secondary Component Carrier (SCC) in the aggregated carriers, and the SCC only provides extra wireless resources. Both the PCC and the SCC are called serving cells. According to the standard, a maximum quantity of aggregated carriers is 5, that is, a maximum bandwidth after aggregation is 100 MHZ, and aggregated carriers belong to a same network device. All aggregated carriers use a same Cell Radio Network Temporary Identifier (C-RNTI), and the network device realizes that the C-RNTI does not conflict in a cell where each carrier is located. Since both asymmetric carrier aggregation and symmetric carrier aggregation are supported, it is required that aggregated carriers must have downlink, and may have no uplink. In addition, for the Primary Component Carrier cell, there must be a Physical Downlink Control Channel (PDCCH) and a PUCCH of the Primary Component Carrier cell.

A Secondary Cell (SCell) is configured by an RRC dedicated signaling, an initial configuration state of the Secondary Cell is an RRC_INACTIVE state, and data cannot be sent and received in the RRC_INACTIVE state. Then the SCell can be activated through Media Access Control (MAC) Control Element (CE) to send and receive data. From a point of view of SCell configuration and activation delay, a CA architecture is not an optimal architecture. This delay reduces an efficiency of CA using wireless resources, especially in small cell deployment scenarios. In a dense small cell deployment scenario, a signaling load of each SCell is also very large; under a condition that each SCell needs to be configured independently, the signaling load of the SCell is further increased. Therefore, an extra delay is introduced in a current CA architecture, limiting use of CA and reducing a gain of CA load sharing.

In view of the above problems, CA is optimized, including: measurement configuration in an RRC_IDLE state may be configured in an RRC release message sent by a network device to a terminal device, and the measurement configuration in the RRC_IDLE state may also be configured in a system broadcast message SIB5. In case of a dedicated signaling, the dedicated signaling is used to configure the measurement configuration in the RRC_IDLE state; otherwise, the measurement configuration in the SIB5 is used. In addition, the measurement configuration in the RRC_IDLE state in the SIB5 has no valid time limit, and the measurement configuration in the RRC_IDLE state configured in the dedicated signaling has a valid time configuration, i.e. a timer T331. When the timer T331 times out or stops, the measurement configuration in the RRC_IDLE state configured in the dedicated signaling is released. Whether a terminal device continues to use the measurement configuration in the RRC_IDLE state in the SIB5 depends on implementation of the terminal device.

After the terminal device obtains the measurement configuration in the RRC_IDLE state, the terminal device performs measurement; it is indicated in an uplink message to a network device that there is a measurement result in the RRC_IDLE state, and then the measurement result is reported based on a request mode of the network device. At the same time, a cell will also broadcast in a SIB2 whether reporting of the measurement result in the RRC_IDLE state is supported.

Figure 6:
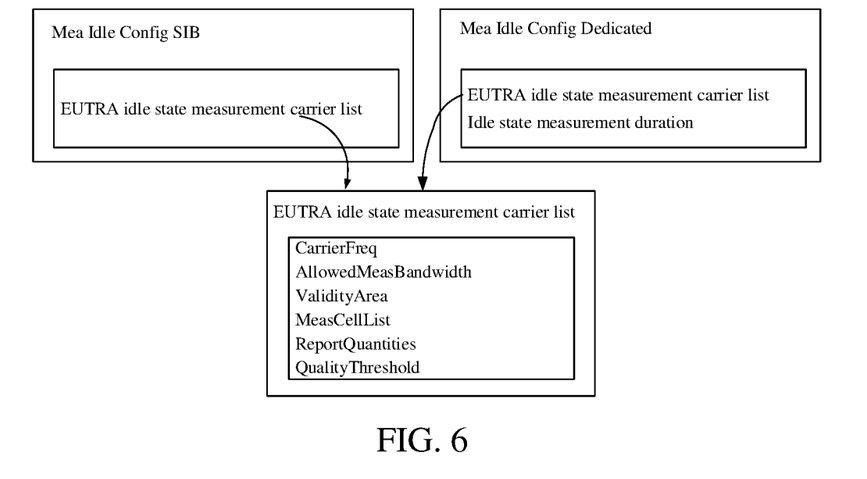
FIG. 6 is a schematic diagram of measurement configuration information in an idle state in the present application.

Measurement configuration information in the RRC_IDLE state is shown in FIG. 6, including SIB idle state measurement configuration (Mea Idle Config SIB) and dedicated idle state measurement configuration (Mea Idle Config Dedicated). A carrier frequency (carrierFreq) and an allowed measurement bandwidth (allowedMeasBandwidth) indicate a measured frequency point and a measurement bandwidth. A validityArea is configured with a valid range of idle state measurement configuration, and is a cell list. If the terminal device reselects to a cell outside the validityArea, the timer T331 is stopped. A measurement cell list (measCellList)

provides cells of which reporting for the measurement configuration will be performed, and reporting for the measurement configuration of cells other than the measCellList need not be performed. If the measCellList is not configured, the terminal device reports measurement reports of max-CellMeasIdle cells that meet a qualityThreshold. The reported measurement results are specified by reportQuantities.

A stop condition of the timer T331 and a behavior of the timer T331 after timeout are shown in Table 1 below.

TABLE 1

| Timer | Start | Stop | Timeout |
|---|---|---|---|
| T331 | After receiving an RRC connection release message including a measurement idle state configuration | After receiving RRC connection Setup, RRC connection Resume, or a reselected cell does not belong to a validity Area after the validity Area is configured | Release stored measurement idle configuration |

When the terminal device receives an RRC Release message containing measIdleConfig, the terminal device starts the timer T331, and starts measurement after entering an IDLE or INACTIVE state. When the terminal device receives an RRC Setup message or an RRC Resume message or reselects to a cell that is not in the validityArea, the terminal device stops the timer T331. When the timer T331 times out, the terminal device releases stored measurement result, i.e., VarMeasIdleConfig.

According to the measurement result of the terminal device, the terminal device may indicate in an RRC Resume Request message that it has an idlemeasurement result to report; a network device may indicate, in an RRC Resume message, the terminal device to report the measurement result. The terminal device may report the measurement result in an RRC Resume Complete message at the earliest.

However, when the terminal device tries to resume a connection, a network device has no effective control over measurement (such as measurement under the IDLE or INACTIVE state), for example, the network equipment has no effective control over a list of cells measured by the terminal device, measured parameters, whether a measurement result needs to be reported, etc. As a result, the terminal device is still measuring when measurement is not needed, or the terminal device is still measuring a cell that does not need to be measured or a parameter that does not need to be measured, or when the network device does not need the terminal device to report a measurement result, the terminal device still reports the measurement result to the network device. In this way, not only signaling overhead of a system is increased, but also power consumption of the terminal device is increased.

In view of the above problems, the present application provides a measurement control method, and the measurement control method of the embodiment of the present application may be applied to various communication systems, such as a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, an advanced long term evolution (LTE-A) system, a new radio (NR) system, an evolution system of an NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, wireless local area networks (WLAN), wireless fidelity (WiFi), a next generation communication system, or other communication systems.

Generally speaking, a traditional communication system supports a limited quantity of connections and is easy to implement. However, with development of communication technologies, mobile communication systems will not only support traditional communication, but also support, for example, device to device (D2D) communication, machine to machine (M2M) communication, machine type communication (MTC), vehicle to vehicle (V2V) communication, and the embodiments of the present application may also be applied to these communication systems.

System architectures and service scenarios described in the embodiments of the present application are intended to more clearly illustrate technical solutions of the embodiments of the present application, and do not constitute a limitation on the technical solutions provided in the embodiments of the present application. Those of ordinary skill in the art may understand that with evolution of network architectures and emergence of new service scenarios, the technical solutions provided by the embodiments of the present application are also applicable to similar technical problems.

The network device involved in the embodiments of the present application may be an ordinary base station (such as NodeB or eNB or gNB), a new radio controller (NR controller), a centralized unit, a new radio base station, an RF remote module, a micro base station, a relay, a distributed unit, a transmission reception point (TRP), a transmission point (TP), or any other device. The embodiments of the present application do not limit a specific technology and a specific device form adopted by the network device. For convenience of description, in all embodiments of the present application, the above-mentioned device for providing wireless communication functions for a terminal device are collectively referred to as a network device.

In the embodiment of the present application, a terminal device may be any terminal, for example, the terminal device may be a User Equipment of machine type communication. That is, the terminal device may be referred to as a User Equipment (UE), a Mobile Station (MS), a mobile terminal, a terminal, etc. The terminal device may communicate with one or more core networks via a Radio Access Network (RAN). For example, a terminal device may be a mobile phone (or a "cellular" phone), a computer with a mobile terminal, etc. For example, terminal devices may be portable, pocket-size, handheld, computer-built, or vehicle-mounted mobile apparatuses, and they exchange voice and/or data with a wireless access network. It is not specifically limited in the embodiments of the present application.

Optionally, a network device and a terminal device may be deployed on land, including indoors or outdoors, handheld or vehicle-mounted; or may be deployed on a water surface; or may be deployed on a plane, a balloon, and an artificial satellite in the air. The embodiments of the present application do not limit application scenarios of the network device and the terminal device.

Optionally, communication between a network device and a terminal device and communication between a terminal device and another terminal device may be conducted through a licensed spectrum, or an unlicensed spectrum, or both. Communication between a network device and a terminal device and communication between a terminal device and another terminal device may be conducted through a frequency spectrum below 7 gigahertz (GHz), or a frequency spectrum above 7 GHz, or both a frequency spectrum below 7 GHz and a frequency spectrum above 7 GHz. The embodiments of the present application do not limit a spectrum resource used between the network device and the terminal device.

Generally speaking, a traditional communication system support a limited quantity of connections and is easy to implement. However, with development of communication technologies, mobile communication systems will not only support traditional communication, but also support, for example, device to device (D2D) communication, machine to machine (M2M) communication, machine type communication (MTC), vehicle to vehicle (V2V) communication, and the embodiments of the present application may also be applied to these communication systems.

Figure 7:
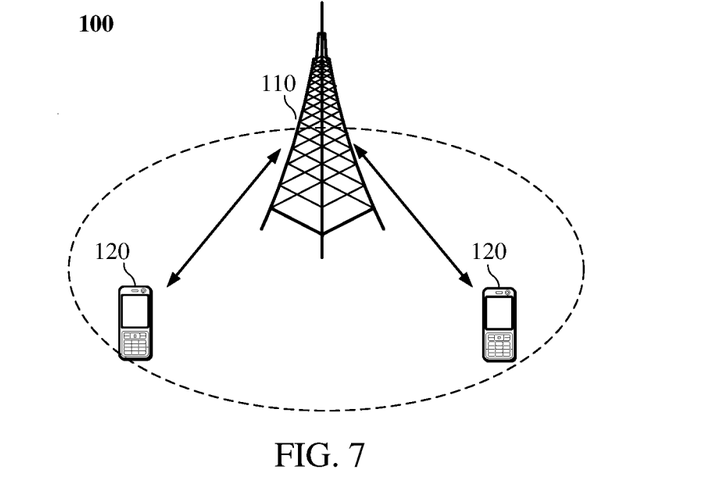
FIG. 7 is a schematic diagram of a structure of a communication system according to an embodiment of the present application.

Illustratively, a communication system 100 applied in an embodiment of the present application is shown in FIG. 7. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or a CDMA system, or a NodeB (NB) in a WCDMA system, or an Evolutional Node B (eNB or eNodeB) in an LTE system, or a radio controller in a Cloud Radio Access Network (CRAN), or the network device may be a mobile handover center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage area of the network device 110. As used herein, the term "terminal device" includes, but is not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, or an AM-FM broadcast transmitter; and/or another terminal device; and/or an Internet of Things (IoT) device. A terminal device configured to communicate via a wireless interface may be referred to as "a wireless communication terminal", "a wireless terminal", or "a mobile terminal". Examples of the mobile terminal include, but are not limited to, a satellite or cellular phone; a Personal Communications System (PCS) terminal which may combine a cellular radio phone with data processing, facsimile, and data communication abilities; a Personal Digital Assistant (PDA) that may include a radio phone, a pager, internet/intranet access, a Web browser, a memo pad, a calendar, and/or, a Global Positioning System (GPS) receiver; and a conventional laptop and/or palmtop receiver, or another electronic apparatus including a radio phone transceiver. The terminal device may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN.

Optionally, Device to Device (D2D) communication may be performed between the terminal devices 120.

Optionally, the 5G system or the 5G network may also be referred to as a New Radio (NR) system or an NR network.

FIG. 7 exemplarily illustrates one network device and two terminal devices. Optionally, the communication system 100 may include multiple network devices, and other quantities of terminal devices may be included within a coverage area of each network device, which is not limited in the embodiments of the present application.

Optionally, the communication system 100 may also include another network entity, such as a network controller, a mobile management entity, or the like, which is not limited in the embodiments of the present application.

It should be understood that a device with a communication function in a network/system in the embodiments of the present application may also be referred to as a communication device. Taking the communication system 100 shown in FIG. 7 as an example, communication devices may include a network device 110 and terminal devices 120 which have communication functions, and the network device 110 and the terminal devices 120 may be the specific devices described above, which will not be described repeatedly herein. The communication devices may also include other devices in the communication system 100, for example other network entities, such as network controllers and mobile management entities, which is not limited in the embodiments of the present application.

Figure 8:
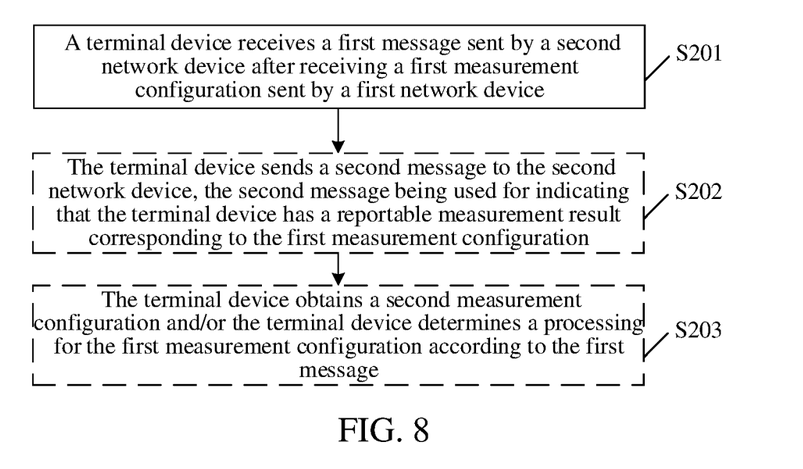
FIG. 8 is a schematic diagram of an optional processing flow of a measurement control method provided in an embodiment of the present application.

As shown in FIG. 8, an optional processing flow of a measurement control method provided by an embodiment of the present application includes the following act S201.

In act S201, a terminal device receives a first message sent by a second network device after receiving a first measurement configuration sent by a first network device.

In some embodiments, the first message is used for the terminal device to obtain a second measurement configuration, and/or for the terminal device to determine a processing for the first measurement configuration, wherein the first measurement configuration and the second measurement configuration are cell measurement configurations in a validity area.

The first network device and the second network device may be a same network device or different network devices. The first measurement configuration and the second measurement configuration may be for a same state or for different states. For example, the first measurement configuration and the second measurement configuration are both for an idle state, or both are for an inactive state, or the first measurement configuration is for an idle state and the second measurement configuration is for an inactive state, or the first measurement configuration is for an inactive state and the second measurement configuration is for an idle state.

In some embodiments, the first measurement configuration may be a measurement configuration received by the terminal device from a connection release message of a previous serving cell, and the measurement configuration may be a measurement configuration for an idle state, such as measIdleConfig; and it may be a measurement configuration for an inactive state, such as measInactiveConfig. After receiving the first measurement configuration, the terminal device starts a timer T331, and performs cell measurement corresponding to the first measurement configuration after entering an idle state or an inactive state.

After the act S201 is performed, the method further includes acts S202 and S203.

In act S202, the terminal device sends a second message to the second network device, wherein the second message is used for indicating that the terminal device has a reportable measurement result corresponding to the first measurement configuration.

In some embodiments, the second message is an RRC resume request message.

In an optional embodiment, the terminal device triggers a connection resume process, such as triggering the connection resume process through RNAU; the terminal device sends an RRC Resume Request message to a cell on which the terminal device camps, and the RRC Resume Request message indicates that the terminal device has a reportable measurement result. The cell on which the terminal device camps may be a cell corresponding to the first network device or may not be a cell corresponding to the first network device.

In act S203, the terminal device obtains a second measurement configuration according to the first message, and/ or the terminal device determines a processing for the first measurement configuration.

With respect to the first message, in some embodiments, the first message is used for the terminal device to determine at least one of the following: whether the terminal device stops measuring a cell in the validity Area indicated by the first measurement configuration; whether the terminal device deletes the first measurement configuration; whether the terminal device stops a timer, the timer being started in a case where the terminal device receives the first measurement configuration; and whether the terminal device releases a stored measurement result corresponding to the first measurement configuration.

The above information may be independent or related to each other. For example, the first message may be used to determine that the terminal device stops measuring a cell in the validity area indicated by the first measurement configuration and stops a timer. Or, the first message may be used to determine that the terminal device stops measuring a cell in the validity area indicated by the first measurement configuration, but does not stop a timer.

Optionally, the first measurement configuration may be a measurement configuration for an idle state or a configuration for an inactive state; and the timer may be a T331 timer.

Figure 9:
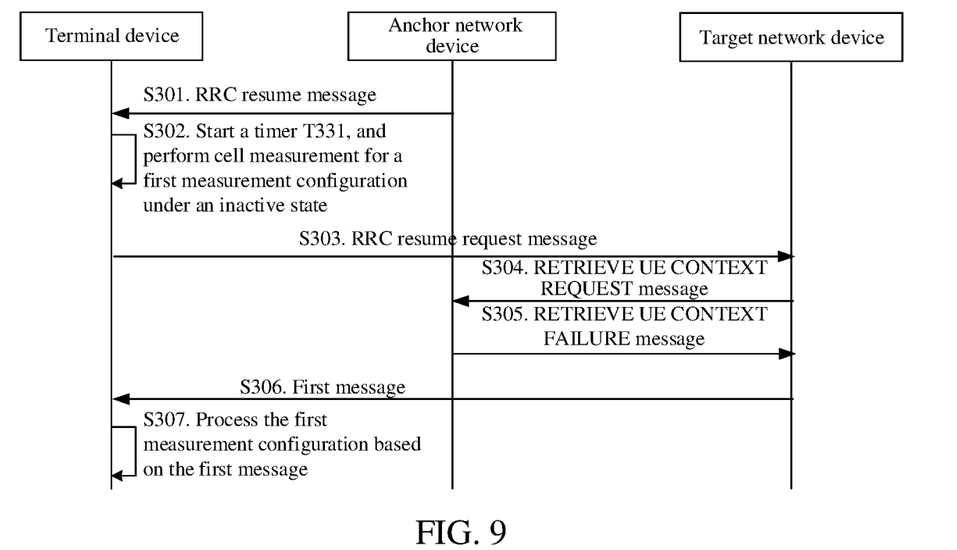
FIG. 9 is a schematic diagram of an optional processing flow for a terminal device to process a first measurement configuration according to a first message according to an embodiment of the present application.

In a case where the first message is used to determine at least one of the following: whether the terminal device stops measuring a cell in the validity area indicated by the first measurement configuration, whether the terminal device deletes the first measurement configuration, whether the terminal device stops a timer being started in a case where the terminal device receives the first measurement configuration, and whether the terminal device releases a stored measurement result corresponding to the first measurement configuration, the terminal device can determine a processing for the first measurement configuration according to the first message. As shown in FIG. 9, an optional processing flow for the terminal device to process the first measurement configuration according to the first message includes following acts S301-S307.

In act S301, an anchor network device sends an RRC Release message to a terminal device.

In some embodiments, the RRC Release message includes a first measurement configuration.

In act S302, the terminal device starts a timer T331, and performs cell measurement for the first measurement configuration under an inactive state.

In act S303, the terminal device sends an RRC Resume Request message to a target network device.

In some embodiments, the RRC Resume Request message sent by the terminal device to the network device indicates that the terminal device has a reportable measurement result of an idle state or an inactive state.

In act S304, the target network device sends a RETRIEVE UE CONTEXT REQUEST message to the anchor network device.

In some embodiments, the RETRIEVE UE CONTEXT REQUEST message is used to request to retrieve a UE context.

In act S305, the anchor network device sends a RETRIEVE UE CONTEXT FAILURE message to the target network device.

In some embodiments, the RETRIEVE UE CONTEXT FAILURE message is used to respond to the RETRIEVE UE CONTEXT REQUEST message, and informs the target network device that there is no UE context to return.

In act S306, the target network device sends a first message to the terminal device.

In an optional embodiment, after the target network device receives the RRC Resume REQUEST message sent by the terminal device, the target network device determines that there is no data to be sent, that is, the terminal device does not need to be transferred into a connected state and CA does not need to be configured. Therefore, the target network device does not need the terminal device to report a measurement result for an idle state or an inactive state; and the target network device sends an RRC Release message to the terminal device to release the terminal device back to an active state or an idle state. In this scenario, the first message may be an RRC Release message, which is used to indicate at least one of the following: whether the terminal device stops a timer, whether the terminal device deletes the first measurement configuration, whether the terminal device stops measuring a cell in the validity area indicated by the first measurement configuration, and whether the terminal device releases a stored measurement result corresponding to the first measurement configuration.

In act S307, the terminal device processes the first measurement configuration based on the first message.

In some embodiments, the terminal device performs at least one of the following operations based on the first message: stopping a timer, deleting a first measurement configuration, stopping measurement of a cell in a validity area indicated by the first measurement configuration, and releasing a stored measurement result corresponding to the first measurement configuration.

According to the embodiment of the present application, for a scenario that measurement for an idle state or an inactive state is not needed, the measurement for the idle state or the inactive state can be stopped in time, and a measurement result of the idle state or the inactive state can be deleted in time, not only can power be saved, but also a storage load of the terminal device can be reduced.

For the first message, in some other embodiments, the first message includes at least one of the following: a first indication and a full configuration (fullconfig) of the second measurement configuration, wherein the first indication is used to determine that the first message includes the full configuration of the second measurement configuration; the terminal device retaining a measurement result corresponding to a common configuration in the first measurement configuration and the second measurement configuration; the terminal device continuing to perform measurement for the common configuration in the first measurement configuration and the second measurement configuration; the terminal device deleting a measurement result corresponding to a non-common configuration in the first measurement configuration and the second measurement configuration; the terminal device stopping measuring for the non-common configuration in the first measurement configuration and the second measurement configuration; and the terminal device restarting the timer.

The above information may be independent or related to each other. For example, the first message may include that the terminal device retains a measurement result corresponding to a common configuration in the first measurement configuration and the second measurement configuration, and stops a timer; or, the first message may include that the terminal device retains a measurement result corresponding to a common configuration in the first measurement configuration and the second measurement configuration, but does not stop a timer. The common configuration refers to a configuration included in both the first measurement configuration and the second measurement configuration; if a common configuration in the first measurement configuration is different from a common configuration in the second measurement configuration, the terminal device performs measurement according to the common configuration in the second measurement configuration. For example, the first measurement configuration includes a measurement cell list including cells A, B, and C; the second measurement configuration also includes a measurement cell list, then the measurement cell list is a common measurement configuration in the first measurement configuration and the second measurement configuration. If the measurement cell list in the second measurement configuration includes cells B, C, and D, the terminal device performs measurement according to the measurement cell list in the second measurement configuration.

Optionally, the first measurement configuration may be a measurement configuration for an idle state or a configuration for an inactive state; and the timer may be a T331 timer.

Figure 10:
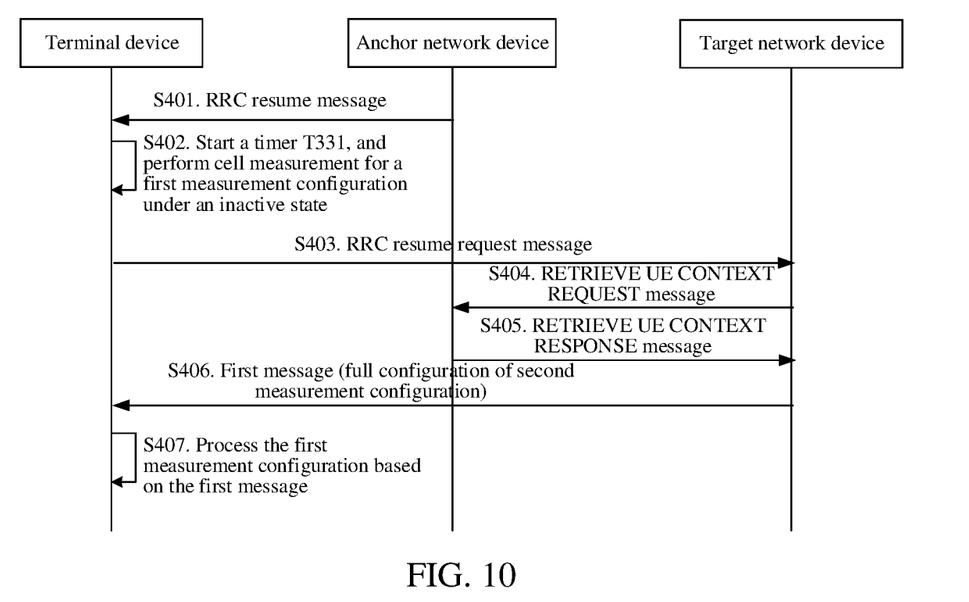
FIG. 10 is a schematic diagram of another optional processing flow for a terminal device to obtain a second measurement configuration and process the first measurement configuration based on a first message according to an embodiment of the present application.

In a case where the first message includes at least one of: a first indication and a full configuration of the second measurement configuration, wherein the first indication is used to determine that the first message includes the full configuration of the second measurement configuration; the terminal device retaining a measurement result corresponding to a common configuration in the first measurement configuration and the second measurement configuration; the terminal device continuing to perform measurement for a common configuration in the first measurement configuration and the second measurement configuration; the terminal device deleting a measurement result corresponding to a non-common configuration in the first measurement configuration and the second measurement configuration; the terminal device stopping measuring for a non-common configuration in the first measurement configuration and the second measurement configuration; and the terminal device restarting a timer, the terminal device can obtain a second measurement configuration and determine a processing for the first measurement configuration according to the first message. As shown in FIG. 10, another optional processing flow for the terminal device to obtain a second measurement configuration and process the first measurement configuration according to the first message includes following acts S401-S407.

In act S401, an anchor network device sends an RRC Release message to a terminal device.

In some embodiments, the RRC Release message includes a first measurement configuration.

In act S402, the terminal device starts a timer T331, and performs cell measurement for the first measurement configuration in an inactive state.

In act S403, the terminal device sends an RRC Resume Request message to a target network device.

In some embodiments, the RRC Resume Request message sent by the terminal device to the network device indicates that the terminal device has a reportable measurement result of an idle state or an inactive state.

In act S404, the target network device sends a RETRIEVE UE CONTEXT REQUEST message to the anchor network device.

In some embodiments, the RETRIEVE UE CONTEXT REQUEST message is used to request to retrieve a UE context.

In act S405, the anchor network device sends a RETRIEVE UE CONTEXT RESPONSE message to the target network device.

In some embodiments, the target network device can obtain a first measurement configuration through a RETRIEVE UE CONTEXT RESPONSE message. The target network device obtains a full configuration of a second measurement configuration by modifying the first measurement configuration.

In act S406, the target network device sends a first message to the terminal device, wherein the first message includes a full configuration of a second measurement configuration.

In some embodiments, after the target network device receives the RRC Resume REQUEST message sent by the terminal device, the target network device determines that there is no data to be sent, that is, the terminal device does not need to be transferred into a connected state and CA does not need to be configured. Therefore, the target network device does not need the terminal device to report a measurement result for an idle state or an inactive state; and the target network device sends an RRC Release message to the terminal device to release the terminal device back to an active state or an idle state. In this scenario, the first message may be an RRC Release message. When the target network device determines that there is data to be sent, that is, the terminal device needs to be transferred into a connected state, the target network device sends an RRC Resume message to the terminal device to transfer the terminal device into the connected state. When data transmission is completed, the target network device sends an RRC Release message to the terminal device to release the terminal device back to an active state or an idle state. In this scenario, the first message may be an RRC Release message. For the above two scenarios, the RRC Release message includes at least one of: a first indication and a full configuration of the second measurement configuration, wherein the first indication is used to determine that the first message includes the full configuration of the second measurement configuration; the terminal device retaining a measurement result corresponding to a common configuration in the first measurement configuration and the second measurement configuration; the terminal device continuing to perform measurement for a common configuration in the first measurement configuration and the second measurement configuration; the terminal device deleting a measurement result corresponding to a non-common configuration in the first measurement configuration and the second measurement configuration; the terminal device stopping measuring for a non-common configuration in the first measurement configuration and the second measurement configuration; and the terminal device restarting a timer.

In act S407, the terminal device obtains the second measurement configuration and processes the first measurement configuration based on the first message.

In some embodiments, the terminal device performs at least one of the following operations based on the first message: the terminal device obtains a second measurement configuration; the terminal device retains a measurement result corresponding to a common configuration in the first measurement configuration and the second measurement configuration; the terminal device continues to perform measurement for a common configuration in the first measurement configuration and the second measurement configuration; the terminal device deletes a measurement result corresponding to a non-common configuration in the first measurement configuration and the second measurement configuration; the terminal device stops measuring for a non-common configuration in the first measurement configuration and the second measurement configuration; and the terminal device restarts a timer.

In the embodiment of the present application, different cells have different measurement requirements for a same state of a terminal device state or different states of the terminal device, and the terminal device can delete unnecessary measurement configuration and measurement result of a target cell in time through a full configuration of a second measurement configuration, thereby saving power of the terminal device and reducing a storage load of the terminal device. By sending the full configuration of the second measurement configuration to the terminal device by the network device, the terminal device can receive a latest measurement configuration in time, so as to meet a latest measurement requirement of the network device and realize measurement control by the network device.

For the first message, in still some embodiments, the first message includes at least one of the following: a second indication and an incremental configuration (deltaconfig), wherein the second indication is used for determining that the first message includes the incremental configuration of the second measurement configuration relative to the first measurement configuration; the terminal device retaining a measurement result corresponding to a same configuration in the first measurement configuration and the second measurement configuration; the terminal device continuing to perform measurement for a same configuration in the first measurement configuration and the second measurement configuration; and the terminal device restarting the timer.

The second indication is used for indicating that the second measurement configuration is based on the first measurement configuration and modified in a mode of the incremental configuration. The target network device only modifies some parameters ((such as validityArea) or a measCellList) in the first measurement configuration.

The above information may be independent or related to each other. For example, the first message may include that the terminal device retains a measurement result corresponding to a same configuration in the first measurement configuration and the second measurement configuration, and stops a timer; or, the first message may include that the terminal device retains a measurement result corresponding to a same configuration in the first measurement configuration and the second measurement configuration, but does not stop a timer.

Optionally, the first measurement configuration may be a measurement configuration for an idle state or a configuration for an inactive state; and the timer may be a T331 timer.

The terminal device obtains the second measurement configuration based on the first measurement configuration and the incremental configuration after receiving the second indication and the incremental configuration. For a modified part of the second measurement configuration relative to the first measurement configuration, the terminal device uses a modified configuration; and for an unmodified part of the second measurement configuration relative to the first measurement configuration, the terminal device still uses an unmodified configuration in the first measurement configuration.

Figure 11:
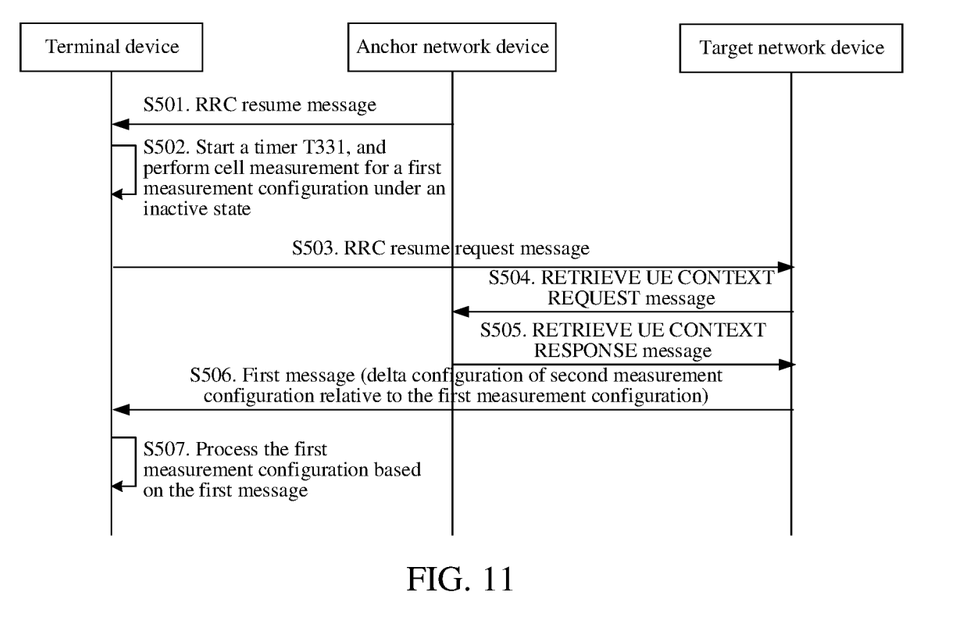
FIG. 11 is a schematic diagram of another optional processing flow for the terminal device to obtain a second measurement configuration and process the first measurement configuration based on a first message according to an embodiment of the present application.

In a case where the first message includes at least one of: a second indication and an incremental configuration, wherein the second indication is used to determine that the first message includes an incremental configuration of the second measurement configuration relative to the first measurement configuration; the terminal device retaining a measurement result corresponding to a same configuration in the first measurement configuration and the second measurement configuration; the terminal device continuing to perform measurement for a same configuration in the first measurement configuration and the second measurement configuration; and the terminal device restarting a timer, the terminal device can obtain the second measurement configuration and determine a processing for the first measurement configuration according to the first message. As shown in FIG. 11, another optional processing flow for the terminal device to obtain a second measurement configuration and process the first measurement configuration according to the first message includes following acts S501-S507.

In act S501, an anchor network device sends an RRC Release message to a terminal device.

In some embodiments, the RRC Release message includes a first measurement configuration.

In act S502, the terminal device starts a timer T331, and performs cell measurement for the first measurement configuration in an inactive state.

In act S503, the terminal device sends an RRC Resume Request message to a target network device.

In some embodiments, the RRC Resume Request message sent by the terminal device to the network device indicates that the terminal device has a reportable measurement result of an idle state or an inactive state.

In act S504, the target network device sends a RETRIEVE UE CONTEXT REQUEST message to the anchor network device.

In some embodiments, the RETRIEVE UE CONTEXT REQUEST message is used to request to retrieve a UE context.

In act S505, the anchor network device sends a RETRIEVE UE CONTEXT RESPONSE message to the target network device.

In some embodiments, the target network device can obtain a first measurement configuration through a RETRIEVE UE CONTEXT RESPONSE message. The target network device obtains a full configuration of a second measurement configuration by modifying the first measurement configuration.

In act S506, the target network device sends a first message to the terminal device, wherein the first message includes a full configuration.

In some embodiments, after the target network device receives the RRC Resume REQUEST message sent by the terminal device, the target network device determines that there is no data to be sent, that is, the terminal device does not need to be transferred into a connected state and CA does not need to be configured. Therefore, the target network device does not need the terminal device to report a measurement result for an idle state or an inactive state; and the target network device sends an RRC Release message to the terminal device to release the terminal device back to an active state or an idle state. In this scenario, the first message may be an RRC Release message. When the target network device determines that there is data to be sent, that is, the terminal device needs to be transferred into a connected state, the target network device sends an RRC Resume message to the terminal device to transfer the terminal device into the connected state. When data transmission is completed, the target network device sends an RRC Release message to the terminal device to release the terminal device back to an active state or an idle state. In this scenario, the first message may be an RRC Release message. For the above two scenarios, the RRC Release message includes at least one of: a second indication and an incremental configuration, wherein the second indication is used to determine that the first message includes the incremental configuration of the second measurement configuration relative to the first measurement configuration; the terminal device retaining a measurement result corresponding to a same configuration in the first measurement configuration and the second measurement configuration; the terminal device continuing to perform measurement for a same configuration in the first measurement configuration and the second measurement configuration; and the terminal device restarting the timer.

In act S507, the terminal device obtains a second measurement configuration and processes the first measurement configuration based on the first message.

In some embodiments, the terminal device performs at least one of the following operations based on the first message: the terminal device obtains a second measurement configuration through a first measurement configuration and the incremental configuration in a UE context; the terminal device retains a measurement result corresponding to a same configuration in the first measurement configuration and the second measurement configuration; the terminal device continues to perform measurement for a same configuration in the first measurement configuration and the second measurement configuration; and the terminal device restarts the timer.

In the embodiment of the present application, different cells have different measurement requirements for a same state of a terminal device or different states of the terminal device, the terminal device can delete unnecessary measurement configuration and measurement result of a target cell in time through an incremental configuration of the second measurement configuration relative to the first measurement configuration, thereby saving power of the terminal device and reducing a storage load of the terminal device. The network device sends the incremental configuration of the second measurement configuration relative to the first measurement configuration to the terminal device, so as to inform the terminal device of a part of a measurement configuration to be updated, thereby reducing signaling overhead and enabling the terminal device to receive a latest measurement configuration in time to meet a latest measurement requirement of the network device and realize measurement control by the network device.

It should be noted that the processing for the first measurement configuration in the embodiment of the present application at least includes any one or more of the following: whether to transmit the first measurement configuration, whether to stop measuring a cell in a validity area indicated by the first measurement configuration, whether to stop a timer that is started when the first measurement configuration is received, whether to release a stored measurement result corresponding to the first measurement configuration, whether to retain a measurement result corresponding to a common configuration in the first measurement configuration and the second measurement configuration, whether to continue measuring for a common configuration in the first measurement configuration and the second measurement configuration, whether to delete a measurement result corresponding to non-common configuration in the first measurement configuration and the second measurement configuration, whether to stop measuring for a non-common configuration in the first measurement configuration and the second measurement configuration, whether to retain a measurement result corresponding to a same configuration in the first measurement configuration and the second measurement configuration, and whether to continue measuring for a same configuration in the first measurement configuration and the second measurement configuration.

It should be understood that in the various embodiments of the present application, sequence numbers of the various processes do not mean execution sequences. The execution sequences of the various processes should be determined according to functions and internal logic of the various processes, and should not constitute any limitation on the implementation processes of the embodiments of the present application.

Figure 12:
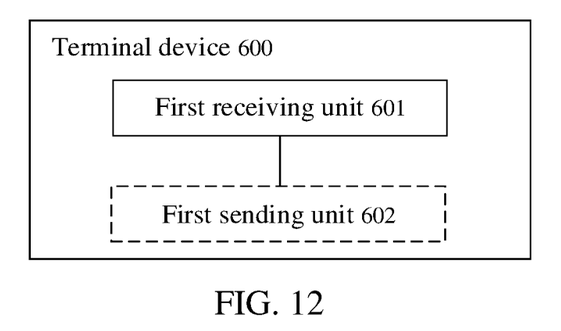
FIG. 12 is a schematic diagram of a composition structure of a terminal device according to an embodiment of the present application.

In order to implement the measurement control method, an embodiment of the present application provides a terminal device. A composition structure of the terminal device 600 is as shown in FIG. 12, and the terminal device 600 includes a first receiving unit 601.

The first receiving unit 601 is configured to receive a first message sent by a second network device after receiving a first measurement configuration sent by a first network device.

The first message is used for the terminal device to obtain a second measurement configuration, and/or for the terminal device to determine a processing for the first measurement configuration, wherein the first measurement configuration and the second measurement configuration are cell measurement configurations in a validity area.

In some embodiments, the first message is used for determining at least one of the following: whether the terminal device stops measuring a cell in the validity area indicated by the first measurement configuration; whether the terminal device deletes the first measurement configuration; whether the terminal device stops a timer, the timer being started in a case where the terminal device receives the first measurement configuration; and whether the terminal device releases a stored measurement result corresponding to the first measurement configuration.

In some embodiments, the first message includes at least one of the following: a second indication and an incremental configuration, wherein the second indication is used for determining that the first message includes the incremental configuration of the second measurement configuration relative to the first measurement configuration; the terminal device retaining a measurement result corresponding to a same configuration in the first measurement configuration and the second measurement configuration; the terminal device continuing to perform measurement for a same configuration in the first measurement configuration and the second measurement configuration; and the terminal device restarting the timer.

In some embodiments, the first message is an RRC release message.

In some embodiments, the terminal device further includes a first sending unit 602 configured to send a second message to the second network device, wherein the second message is used to indicate that the terminal device has a reportable measurement result corresponding to the first measurement configuration.

In some embodiments, the second message is an RRC resume request message.

In some embodiments, a state includes at least any one of the following: an idle state and an inactive state.

Figure 13:
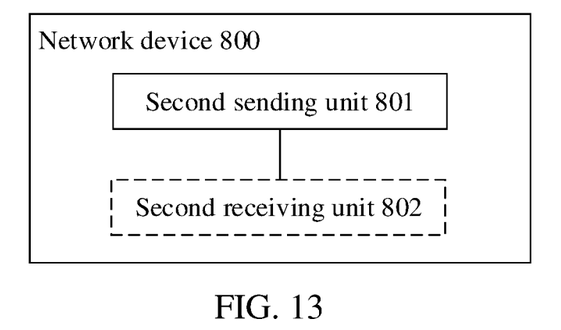
FIG. 13 is a schematic diagram of a composition structure of a network device according to an embodiment of the present application.

In order to implement the measurement control method, an embodiment of the present application provides a network device. A composition structure of the network device 800 is as shown in FIG. 13, and the network device 800 includes a second sending unit 801.

The second sending unit 801 is configured to send a first message to a terminal device.

The first message is used for the terminal device to obtain a second measurement configuration, and/or for the terminal device to determine a processing for the first measurement configuration, wherein the first measurement configuration and the second measurement configuration are cell measurement configurations in a validity area.

In some embodiments, the first message is used for determining at least one of the following: whether the terminal device stops measuring a cell in the validity area indicated by the first measurement configuration; whether the terminal device deletes the first measurement configuration; whether the terminal device stops a timer, the timer being started in a case where the terminal device receives the first measurement configuration; and whether the terminal device releases a stored measurement result corresponding to the first measurement configuration.

In some embodiments, the first message includes at least one of the following: a first indication and a full configuration of the second measurement configuration, wherein the first indication is used to determine that the first message includes the full configuration of the second measurement configuration; the terminal device deleting the first measurement configuration and stores the second measurement configuration; the terminal device retaining a measurement result corresponding to a common configuration in the first measurement configuration and the second measurement configuration; the terminal device continuing to perform measurement for a common configuration in the first measurement configuration and the second measurement configuration; the terminal device deleting a measurement result corresponding to a non-common configuration in the first measurement configuration and the second measurement configuration; the terminal device stopping measuring for a non-common configuration in the first measurement configuration and the second measurement configuration; and the terminal device restarting the timer.

In some embodiments, the first message includes at least one of the following: a second indication and an incremental configuration, wherein the second indication is used for determining that the first message includes an incremental configuration of the second measurement configuration relative to the first measurement configuration; the terminal device retaining a measurement result corresponding to a same configuration in the first measurement configuration and the second measurement configuration; the terminal device continuing to perform measurement for a same configuration in the first measurement configuration and the second measurement configuration; and the terminal device restarting the timer.

In some embodiments, the first message is an RRC release message.

In some embodiments, the network device 800 further includes a second receiving unit 802.

The second receiving unit 802 is configured to receive a second message sent by the terminal device, wherein the second message is used to indicate that the terminal device has a reportable measurement result corresponding to the first measurement configuration.

In some embodiments, the second message is an RRC resume request message.

In some embodiments, the state includes at least any one or two of the following: an idle state and an inactive state.

An embodiment of the present application further provides a terminal device, including: a processor and a memory configured to store a computer program which is runnable on the processor, wherein the processor is configured to execute acts of the measurement control method implemented by the above terminal device when running the computer program.

An embodiment of the present application further provides a network device, including a processor and a memory configured to store a computer program that is runnable on the processor, wherein the processor is configured to execute acts of the measurement control method implemented by the above network device when running the computer program.

Figure 14:
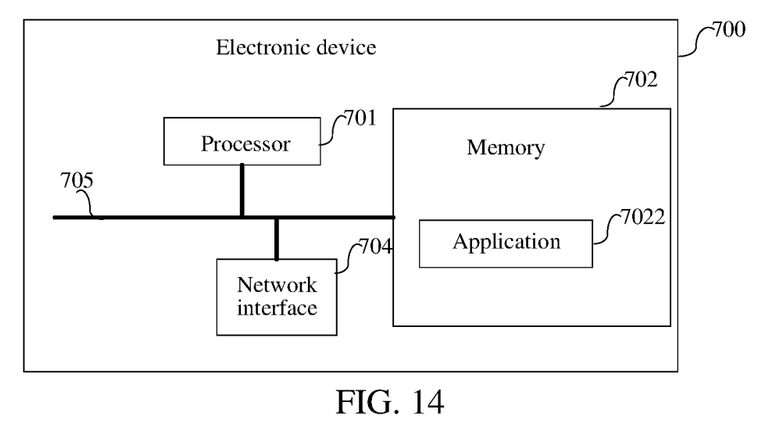
FIG. 14 is a schematic diagram of a hardware composition structure of an electronic device according to an embodiment of the present application.

FIG. 14 is a schematic diagram of a hardware composition structure of an electronic device (a network device and a terminal device) of an embodiment of the present application. The electronic device 700 includes: at least one processor 701, a memory 702, and at least one network interface 704. Various components in the electronic device 700 are coupled together by a bus system 705. It may be understood that the bus system 705 is used for implementing connection and communication between these components. In addition to a data bus, the bus system 705 further includes a power bus, a control bus, and a status signal bus. However, for clarity, all kinds of buses are uniformly referred to as a bus system 705 in FIG. 14.

It may be understood that the memory 702 may be a volatile memory or a non-volatile memory, or may include both the volatile memory and the non-volatile memory. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disk, or a Compact Disc Read-Only Memory (CD-ROM). The magnetic surface memory may be a magnetic disk memory or a magnetic tape memory. The transitory memory may be a Random Access Memory (RAM) which serves as an external cache. By way of exemplary but not restrictive illustrations, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRS-DRAM), an Enhanced Synchronous Dynamic Random Access Memory (ESDRAM), a SyncLink Dynamic Random Access Memory (SLDRAM), a Direct Rambus Random Access Memory (DRRAM). The memory 702 described in the embodiment of the present application is intended to include, but is not limited to, these and any other suitable types of memories.

The memory 702 in the embodiment of the present application is configured to store various types of data to support operations of the electronic device 700. Examples of such data include any computer program for operating on the electronic device 700, such as an application 7022. A program for implementing the method of the embodiment of the present application may be contained in an application program 7022.

Methods disclosed in above embodiments of the present application may be applied to the processor 701 or implemented by the processor 701. The processor 701 may be an integrated circuit chip with a signal processing capability. In an implementation process, the acts of the methods described above may be accomplished by integrated logic circuits of hardware in the processor 701 or instructions in a form of software. The above processor 701 may be a general purpose processor, a Digital Signal Processor (DSP), or other programmable logic devices, a discrete gate or transistor logic device, or a discrete hardware component, etc. The processor 701 may implement or perform the methods, acts, and logical block diagrams disclosed in the embodiments of the present application. The general purpose processor may be a microprocessor or any conventional processor or the like. The acts of the methods disclosed in the embodiments of the present application may be directly embodied to be performed by a hardware decoding processor, or may be performed by a combination of hardware and software modules in a decoding processor. The software module may be located in a storage medium, and the storage medium is located in the memory 702. The processor 701 reads information in the memory 702 and accomplishes the acts of the aforementioned methods in combination with hardware thereof.

In an exemplary embodiment, an electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs or other electronic components, for executing the aforementioned methods.

An embodiment of the present application further provides a storage medium configured to store a computer program.

Optionally, the storage medium may be applied to the terminal device in the embodiment of the present application, and the computer program enables the computer to execute corresponding flow in each method in the embodiment of the present application, which will not be repeated here for brevity.

The present application is described with reference to flowcharts and/or block diagrams of the methods, devices (systems), and computer program products of the embodiments of the present application. It should be understood that each flow and/or block in the flowcharts and/or block diagrams, and combinations of flows and/or blocks in the flowcharts and/or block diagrams may be implemented by computer program instructions. These computer program instructions may be provided to a general purpose computer, a special purpose computer, an embedded processor or a processor of other programmable data processing device to produce a machine, such that the instructions which are executed by the computer or the processor of other programmable data processing device produce apparatus for implementing the functions specified in one or more flows of the flowchart and/or one or more blocks of the block diagram.

These computer program instructions may also be stored in a computer-readable memory that can direct a computer or another programmable data processing device to operate in a specific manner, such that instructions stored in the computer-readable memory produce an article of manufacture including instruction apparatuses that implement functions specified in one or more flows of the flowcharts and/or one or more blocks of the block diagrams.

These computer program instructions may also be loaded onto a computer or other programmable data processing device, such that a series of operational acts are performed on the computer or other programmable device to produce a computer-implemented processing, thereby the instructions which are executed on the computer or other programmable device are used for implementing acts of the functions specified in one or more flows of the flowchart and/or one or more blocks of the block diagram.

The above description is only the preferred embodiments of the present application, and is not intended to limit the protection scope of the present application. Any modification, equivalent substitution, improvement, etc., made within the spirit and principles of the present application shall be included in the protection scope of the present application.

What is claimed is:

1. A measurement control method, comprising:
receiving, by a terminal device, a first message sent by a second network device after receiving a first measurement configuration sent by a first network device;
wherein the first message is used for the terminal device to obtain a second measurement configuration, and/or for the terminal device to determine a processing for the first measurement configuration, wherein the first measurement configuration and the second measurement configuration are cell measurement configurations in a validity area;
wherein the first message comprises at least one of the following:
a second indication and an incremental configuration, wherein the second indication is used for determining that the first message comprises the incremental configuration of the second measurement configuration relative to the first measurement configuration;
the terminal device retaining a measurement result corresponding to a same configuration in the first measurement configuration and the second measurement configuration;

the terminal device continuing to perform measurement for the same configuration in the first measurement configuration and the second measurement configuration.

2. The method of claim 1, wherein the first message is used for determining at least one of the following:
whether the terminal device stops measuring a cell in a validity area indicated by the first measurement configuration;
whether the terminal device deletes the first measurement configuration;
whether the terminal device stops a timer, the timer being started in a case where the terminal device receives the first measurement configuration; and
whether the terminal device releases a stored measurement result corresponding to the first measurement configuration.

3. The method of claim 1, further comprising:
determining, by the terminal device, the second measurement configuration based on the first measurement configuration and the incremental configuration.

4. The method of claim 1, wherein the first message is a Radio Resource Control (RRC) release message.

5. The method of claim 1, wherein the first measurement configuration and the second measurement configuration are for a same state or different states, and the state at least comprises any one or two of the following:
an idle state and an inactive state.

6. A measurement control method, comprising:
sending, by a network device, a first message to a terminal device;
wherein the first message is used for the terminal device to obtain a second measurement configuration, and/or for the terminal device to determine a processing for a first measurement configuration, wherein the first measurement configuration and the second measurement configuration are cell measurement configurations in a validity area;
wherein the first message comprises at least one of the following:
a second indication and an incremental configuration, wherein the second indication is used for determining that the first message comprises the incremental configuration of the second measurement configuration relative to the first measurement configuration;
the terminal device retaining a measurement result corresponding to a same configuration in the first measurement configuration and the second measurement configuration;
the terminal device continuing to perform measurement for the same configuration in the first measurement configuration and the second measurement configuration.

7. The method of claim 6, wherein the first message is used for determining at least one of the following:
whether the terminal device stops measuring a cell in a validity area indicated by the first measurement configuration;
whether the terminal device deletes the first measurement configuration;
whether the terminal device stops a timer, the timer being started in a case where the terminal device receives the first measurement configuration; and
whether the terminal device releases a stored measurement result corresponding to the first measurement configuration.

8. The method of claim 6, wherein the first message is a Radio Resource Control (RRC) release message.

9. The method of claim 6, wherein the first measurement configuration and the second measurement configuration are for a same state or different states, and the state at least comprises any one or two of the following:
an idle state and an inactive state.

10. A terminal device, comprising:
a first receiver, configured to receive a first message sent by a second network device after receiving a first measurement configuration sent by a first network device;
wherein the first message is used for the terminal device to obtain a second measurement configuration, and/or for the terminal device to determine a processing for the first measurement configuration, wherein the first measurement configuration and the second measurement configuration are cell measurement configurations in a validity area;
wherein the first message comprises at least one of the following:
a second indication and an incremental configuration, wherein the second indication is used for determining that the first message comprises the incremental configuration of the second measurement configuration relative to the first measurement configuration;
the terminal device retaining a measurement result corresponding to a same configuration in the first measurement configuration and the second measurement configuration;
the terminal device continuing to perform measurement for the same configuration in the first measurement configuration and the second measurement configuration.

11. The terminal device of claim 10, wherein the first message is used for determining at least one of the following:
whether the terminal device stops measuring a cell in a validity area indicated by the first measurement configuration;
whether the terminal device deletes the first measurement configuration;
whether the terminal device stops a timer, the timer being started in a case where the terminal device receives the first measurement configuration; and
whether the terminal device releases a stored measurement result corresponding to the first measurement configuration.

12. The terminal device of claim 10, wherein the terminal device further comprises:
a processor, configured to determine the second measurement configuration based on the first measurement configuration and the incremental configuration.

13. The terminal device of claim 10, wherein the first message is a radio resource control (RRC) release message.

14. The terminal device of claim 10, wherein the first measurement configuration and the second measurement configuration are for a same state or different states, and the state at least comprises any one or two of the following:
an idle state and an inactive state.

* * * * *